(12) United States Patent
Inaba et al.

(10) Patent No.: US 12,345,973 B2
(45) Date of Patent: Jul. 1, 2025

(54) DISPLAY DEVICE

(71) Applicant: Panasonic Intellectual Property Management Co., Ltd., Osaka (JP)

(72) Inventors: Yasunobu Inaba, Kanagawa Ken (JP); Yuji Matsumoto, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 156 days.

(21) Appl. No.: 18/126,040

(22) Filed: Mar. 24, 2023

(65) Prior Publication Data
US 2023/0314856 A1   Oct. 5, 2023

(30) Foreign Application Priority Data
Mar. 30, 2022 (JP) ................. 2022-057057

(51) Int. Cl.
*G02F 1/1333* (2006.01)
*B60R 1/04* (2006.01)
(Continued)

(52) U.S. Cl.
CPC .......... *G02F 1/133314* (2021.01); *B60R 1/04* (2013.01); *B60R 1/12* (2013.01); *G02F 1/133512* (2013.01); *G02F 1/133553* (2013.01); *G02F 1/1347* (2013.01); *G02F 1/137* (2013.01); *B60R 2001/1215* (2013.01); *B60R 2300/10* (2013.01); *B60R 2300/20* (2013.01); *G02F 2202/28* (2013.01); *G02F 2203/48* (2013.01)

(58) Field of Classification Search
None
See application file for complete search history.

(56) References Cited

U.S. PATENT DOCUMENTS 9,684,204 B2   6/2017  Sakai et al.
10,850,667 B2  12/2020  Baur
(Continued)

FOREIGN PATENT DOCUMENTS

JP   2008203487 A  *  9/2008
JP   2009-109855       5/2009
(Continued)

OTHER PUBLICATIONS

Office Action in Japanese patent application No. 2022-057057 issued Apr. 8, 2025, along with English translation thereof.

*Primary Examiner* — Shan Liu
(74) *Attorney, Agent, or Firm* — GREENBLUM & BERNSTEIN, P.L.C.

(57) ABSTRACT

A display device according to the present disclosure includes an optical member, a first electro-optical member, a housing, and an adhesive layer. The optical member has translucency and has a back surface including a first region and a second region outside the first region. The first electro-optical member is disposed on a back surface side of the optical member, has an optical characteristic changed with voltage application, and has a back surface including a third region and a fourth region outside the third region. The housing is disposed on the back surface side of the optical member and outside the first electro-optical member, and has a protruding portion extending along the back surface of the first electro-optical member. The adhesive layer is disposed between the third region and the protruding portion.

12 Claims, 12 Drawing Sheets

(51) Int. Cl.
   *B60R 1/12*   (2006.01)
   *G02F 1/1335*   (2006.01)
   *G02F 1/1347*   (2006.01)
   *G02F 1/137*   (2006.01)

(56)             References Cited

U.S. PATENT DOCUMENTS

| | | |
|---|---|---|
| 11,448,911 B2 | 9/2022 | Izawa et al. |
| 2009/0086123 A1* | 4/2009 | Tsuji ................. G02F 1/133308 |
| | | 349/58 |
| 2016/0278201 A1* | 9/2016 | Cheon ............... G02F 1/133308 |
| 2019/0196256 A1* | 6/2019 | Kim ..................... G02F 1/1339 |
| 2020/0319669 A1* | 10/2020 | Matsumoto ............ G09F 19/22 |
| 2022/0163838 A1* | 5/2022 | Lin ................... G02F 1/133512 |

FOREIGN PATENT DOCUMENTS

| | | |
|---|---|---|
| JP | 2014-211584 | 11/2014 |
| JP | 2022-17759 | 1/2022 |
| WO | WO2014/112525 | 7/2014 |

\* cited by examiner

DISPLAY DEVICE

CROSS-REFERENCE TO RELATED APPLICATIONS

This application is based upon and claims the benefit of priority from Japanese Patent Application No. 2022-057057, filed on Mar. 30, 2022, the entire contents of which are incorporated herein by reference.

FIELD

The present disclosure relates to a display device.

BACKGROUND

A display device such as an electronic mirror has a display region inside a frame region on a front surface. The display device displays an image in the display region on the front surface in a display mode, and causes the display region on the front surface to function as a mirror in a mirror mode.

A conventional technique is disclosed in U.S. Ser. No. 10/850,667 B2.

In a display device, from a viewpoint of miniaturization and/or weight reduction, frame narrowing in which a width of a frame region is narrowed is desired.

The present disclosure provides a display device in which a frame can be narrowed.

SUMMARY

A display device according to the present disclosure includes an optical member, a first electro-optical member, a housing, and an adhesive layer. The optical member has translucency and has a back surface including a first region and a second region outside the first region. The first electro-optical member is disposed on a back surface side of the optical member, has an optical characteristic changed with voltage application, and has a back surface including a third region and a fourth region outside the third region. The housing is disposed on the back surface side of the optical member and outside the first electro-optical member, and has a protruding portion extending along the back surface of the first electro-optical member. The adhesive layer is disposed between the third region and the protruding portion.

DETAILED DESCRIPTION

Hereinafter, an embodiment of a display device according to the present disclosure will be described with reference to the drawings.

Embodiment

Figure 1:
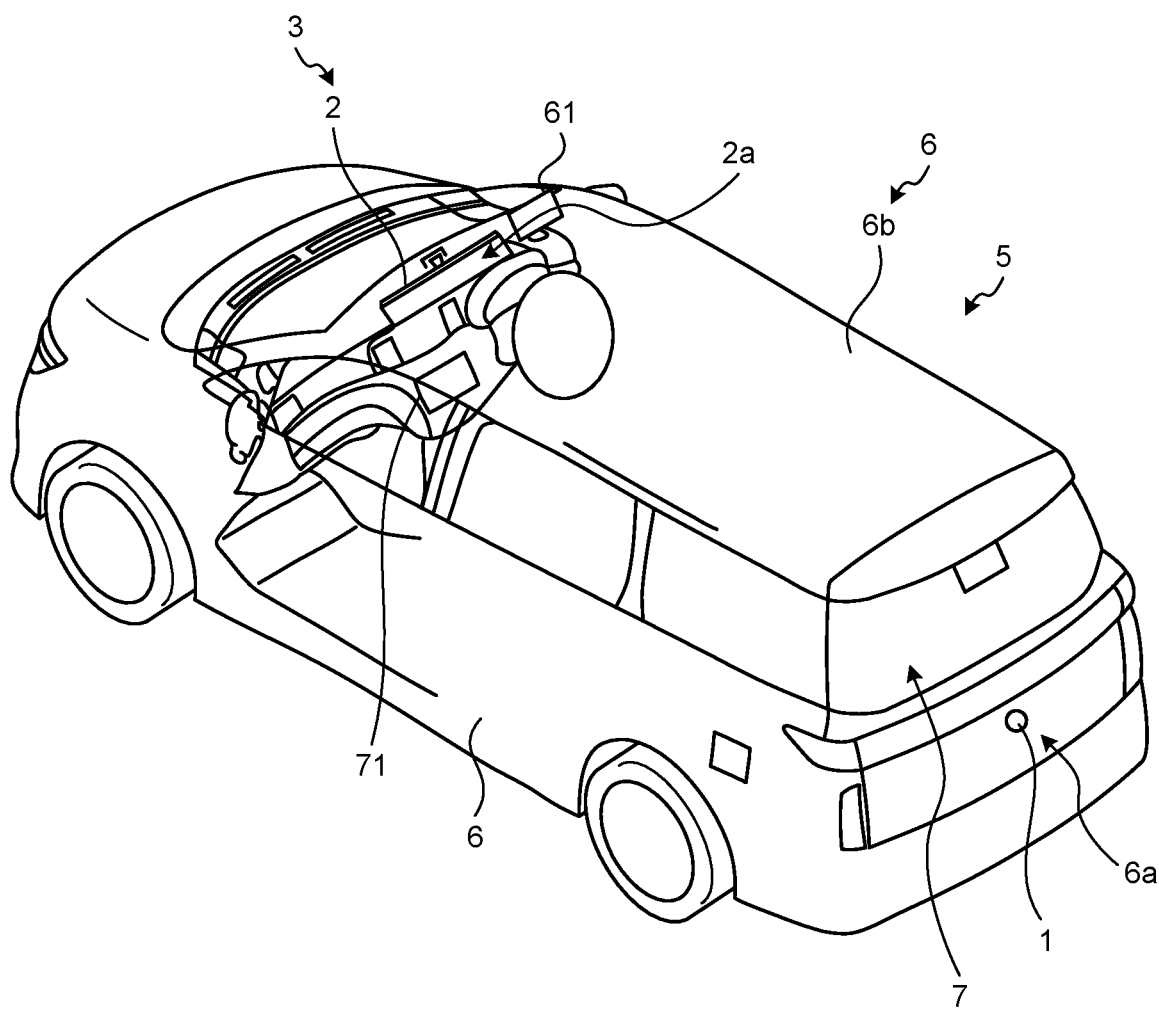
FIG. 1 is a diagram illustrating a vehicle on which an electronic mirror system including a display device according to an embodiment is mounted.

The display device according to the embodiment is, for example, an electronic mirror. The display device according to the embodiment has a frame region at an edge portion on a front surface, but is devised to have a narrowed width of the frame region. Narrowing the width of the frame region may be referred to as frame narrowing. For example, an electronic mirror system 3 can be mounted on a vehicle 5 as illustrated in FIG. 1. FIG. 1 is a diagram illustrating the vehicle 5 on which the electronic mirror system 3 is mounted. The electronic mirror system 3 includes an imaging device 1 and a display device 2.

The imaging device 1 is an onboard camera mounted on the vehicle 5, and is installed outside or inside a vehicle body 6. The imaging device 1 may be installed at a rear end portion of the vehicle body 6 and applied to a rear electronic mirror, may be installed at an end portion near a door of the vehicle body 6 and applied to a side electronic mirror, or may be installed at a front end portion of the vehicle body 6 and applied to a front electronic mirror.

The display device 2 is disposed in a vehicle interior 7. The display device 2 is, for example, an electronic mirror, has a front surface 2a, and can display an image acquired by the imaging device 1 on the front surface 2a. The display device 2 is configured to be switchable between a display mode and a mirror mode. The display mode is a mode in which the display device 2 functions as a display that displays an image captured by the imaging device 1. The mirror mode is a mode in which the display device 2 functions as a mirror.

In a case where the display device 2 is an electronic mirror for rear visual recognition, the display device 2 may be mounted in the form of a rearview mirror, and may have a shape in which the front surface 2a faces a vehicle interior 7 and a shape of the front surface 2a is a mirror surface of the rearview mirror. In a case where the display device 2 is an electronic mirror for side visual recognition, the display device 2 may be mounted in the form of a side-view mirror (for example, a side-view mirror 61), and may have a shape in which the front surface 2a faces the rear of the vehicle body 6 and a shape of the front surface 2a is a mirror surface of the side-view mirror. In a case where the display device 2 is an electronic mirror for forward recognition, the display device 2 may be mounted in the form of a vehicle-mounted display device (for example, a display device 71), and may have a shape in which the front surface 2a faces the vehicle interior 7 and the shape of the front surface 2a is a display unit of the display device.

FIG. 1 illustrates a configuration in which the imaging device 1 is installed at an end portion 6a on a rear side of the vehicle body 6, and the display device 2 is applied to an electronic mirror for rear visual recognition. The electronic mirror for rear visual recognition is also called an electronic rearview mirror. The imaging device 1 acquires an image of a rear side of the vehicle body. The display device 2 can display an image of the rear side of the vehicle body captured by the imaging device 1.

Figure 2:
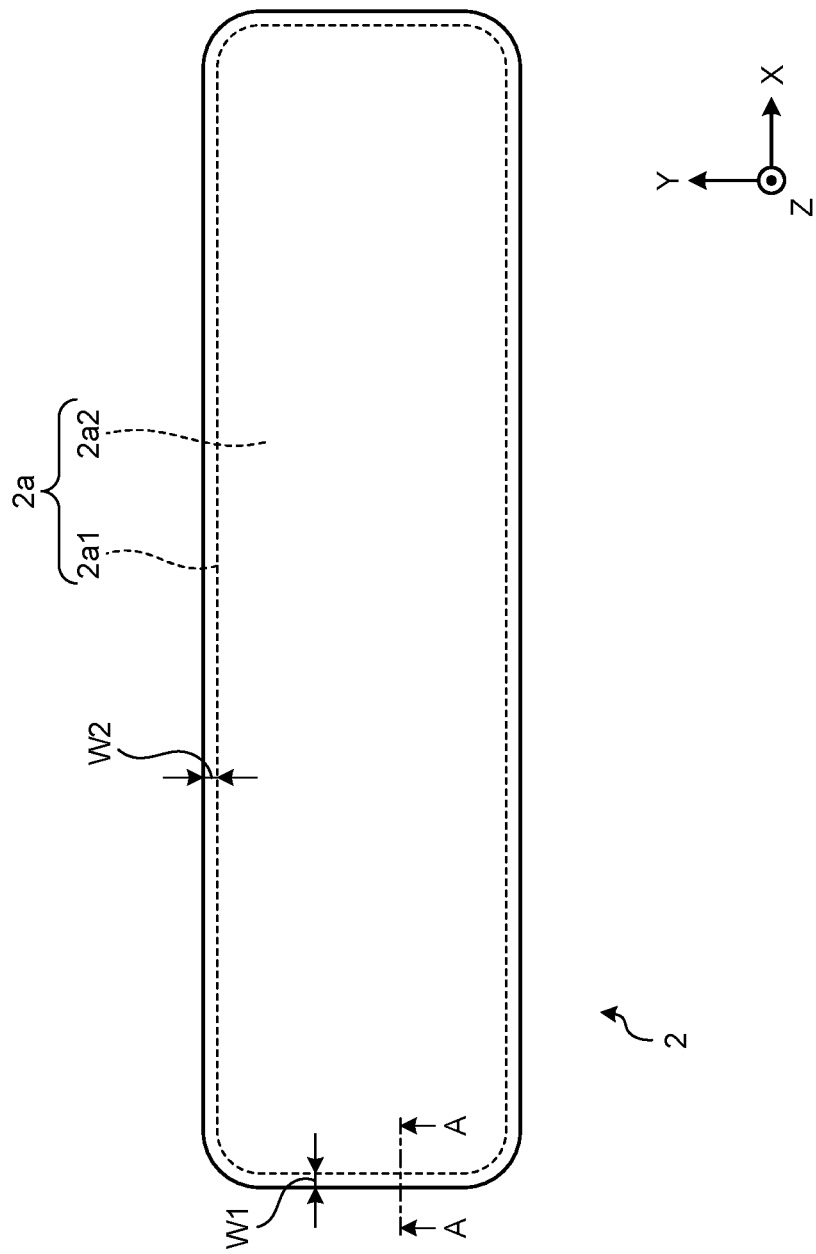
FIG. 2 is a front diagram illustrating a configuration of the display device according to the embodiment.

The display device 2 is as illustrated in FIG. 2 when viewed from a front surface 2a side. FIG. 2 is a front diagram illustrating a configuration of the display device 2. Hereinafter, a direction perpendicular to the front surface 2a is defined as a Z direction, and two directions orthogonal to each other in the front surface 2a are defined as an X direction and a Y direction.

The front surface 2a has, for example, a rectangular shape with rounded corners in an XY plane view. The front surface 2a has a frame region 2a1 and a display region 2a2. The frame region 2a1 is a portion serving as an edge on the front surface 2a. The display region 2a2 is a portion inside the frame region 2a1 on the front surface 2a.

The display device 2 displays an image in the display region 2a2 on the front surface 2a in a display mode, and causes the display region 2a2 on the front surface 2a to function as a mirror in a mirror mode.

The display device 2 may have a variable reflectance mirror (VRM) function. In the case of having the VRM function, the display device 2 may change a reflectance of the display region 2a2 according to luminance or the like of a reflected image in the mirror mode. For example, in the mirror mode, in a case where the luminance of the reflected image is less than a predetermined luminance, the display device 2 may maintain the reflectance of the display region 2a2 at RR1. In a case where the luminance of the reflected image is equal to or higher than a predetermined luminance, the display device 2 may decrease the reflectance of the display region 2a2 to RR2 (<RR1). The case where the luminance of the reflected image is equal to or higher than a predetermined luminance is a case where the headlight of a following vehicle is reflected at a predetermined luminance or higher, a case where sunlight is reflected in a rear image at a predetermined luminance or higher, or the like. Accordingly, the display device 2 can realize automatic anti-glare by the VRM in the mirror mode. In addition, the display device 2 may decrease the reflectance of the display region 2a2 to RR3 (<<RR2) in the display mode. Accordingly, in the display mode, the display device 2 can display an image of an electro-optical member 27 (see FIG. 3) while transmitting the image through the front surface 2a.

On the front surface 2a, the frame region 2a1 generally has a width W1 at a portion extending in the Y direction, and generally has a width W2 at a portion extending in the X direction. The width W1 and the width W2 may be equal to or different from each other.

Figure 3:
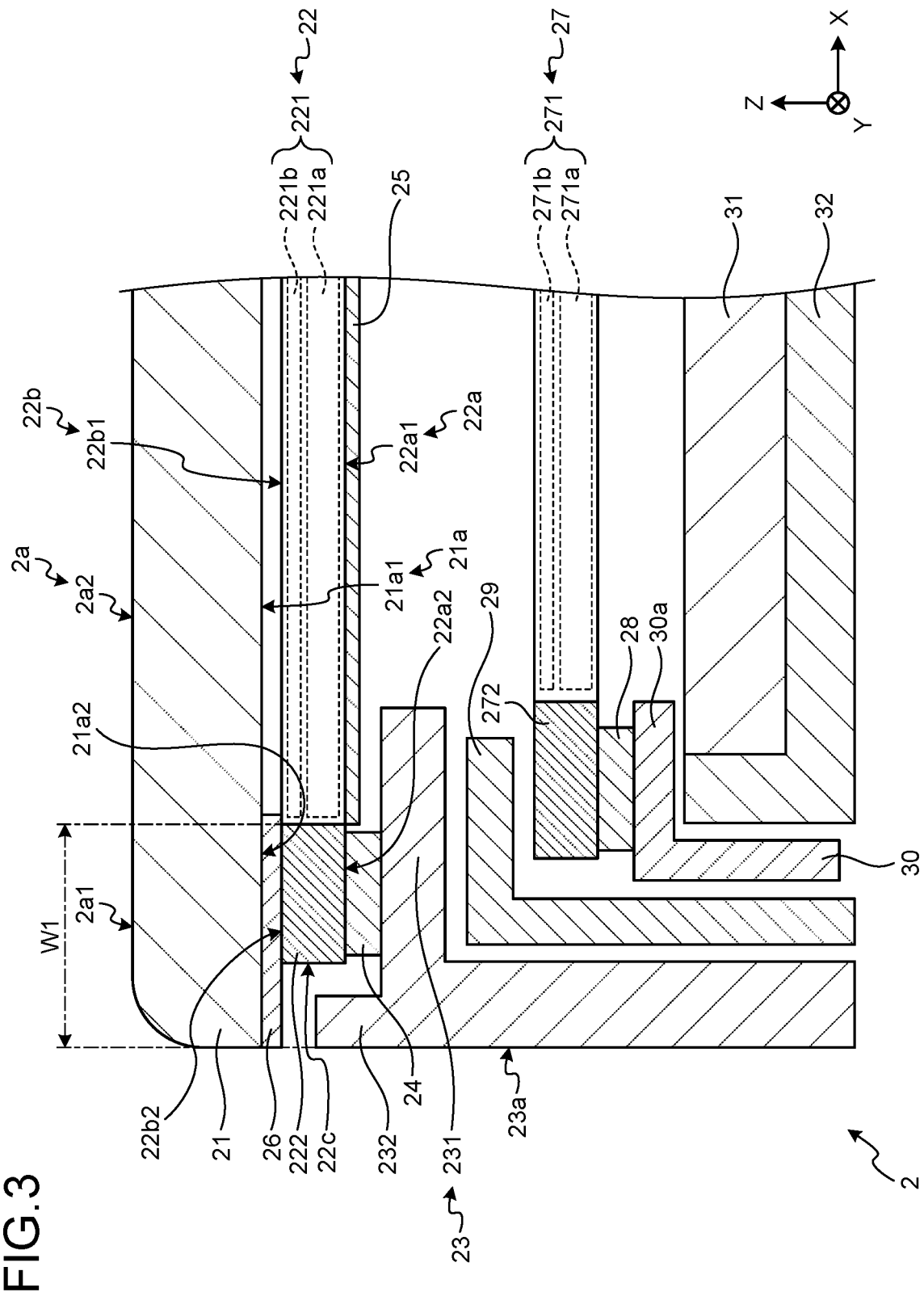
FIG. 3 is a cross-sectional diagram illustrating a configuration of the display device according to the embodiment.

In the display device 2, as illustrated in FIG. 3, the width W1 of the frame region 2al on the front surface 2a can be narrowed by devising an arrangement of an adhesive layer 24. FIG. 3 is an XZ cross-sectional diagram illustrating the configuration of the display device 2, and illustrates an XZ cross section along line A-A in FIG. 2. In FIG. 3, a structure of the XZ cross section corresponding to the portion of the frame region 2al extending in the Y direction is illustrated, but an aspect of the present embodiment is similarly applicable to a structure of the YZ cross section corresponding to the portion of the frame region 2al extending in the X direction.

For example, as illustrated in FIG. 3, the display device 2 includes an optical member 21, an electro-optical member 22, a housing 23, an adhesive layer 24, a half mirror film 25, a light shielding frame 26, an electro-optical member 27, an adhesive layer 28, a frame member 29, a frame member 30, an optical member 31, and a case 32. The VRM function is mainly realized by the electro-optical member 22 and the half mirror film 25.

The optical member 21 extends in a plate shape in an XY direction and has a substantially rectangular shape whose longitudinal direction is the X direction. The optical member 21 has translucency. The optical member 21 may be formed of inorganic glass containing $SiO_2$, or may be formed of organic glass containing a transparent resin such as polymethyl methacrylate (PMMA) resin or polycarbonate (PC). The optical member 21 is also called a cover panel, and can protect the display device 2 from an external impact or the like.

The optical member 21 has a front surface 2a on a +Z side and a back surface 21a on a −Z side. The front surface 2a has a frame region 2a1 and a display region 2a2. The frame region 2a1 is an edge portion of the front surface 2a, and extends in a stripe shape in the Y direction or the X direction along an outer contour of the front surface 2a (see FIG. 2). The display region 2a2 extends planarly in the XY direction inside the frame region 2a1. The back surface 21a has a region 21a1 and a region 21a2. The region 21a2 is located outside the region 21a1 in the XY direction. The region 21a2 corresponds to the frame region 2a1, and overlaps the frame region 2a1 when viewed from the Z direction. The region 21a1 corresponds to the display region 2a2 and overlaps the display region 2a2 when viewed from the Z direction.

The light shielding frame 26 is disposed between the optical member 21 and the electro-optical member 22 in the Z direction. The light shielding frame 26 is disposed between the region 21a2 and the electro-optical member 22 in the Z direction. The light shielding frame 26 has a substantially rectangular outer contour whose longitudinal direction is the X direction. The light shielding frame 26 has an opening corresponding to the display region 2a2. The light shielding frame 26 is in contact with the back surface 21a of the optical member 21 on the +Z side, and covers the region 21a2. The light shielding frame 26 is in contact with the electro-optical member 22 on the −Z side, and covers a +Z side surface of the electro-optical member 22.

A color of the light shielding frame 26 desirably corresponds to a color of the display region 2a2 when the front surface 2a is observed from the +Z side. When the color of the display region 2a2 is silver, the light shielding frame 26 may be mirror-finished printing formed by applying a resin containing a silver pigment to the region 21a2 of the back surface 21a of the optical member 21, or may be a frame-shaped sheet of a resin containing a silver pigment attached to the region 21a2 of the back surface 21a of the optical member 21. When the color of the display region 2a2 is silver close to black, the light shielding frame 26 may be black printing formed by applying a resin containing a black pigment to the region 21a2 of the back surface 21a of the optical member 21, or may be a frame-shaped sheet of a resin containing a black pigment attached to the region 21a2 of the back surface 21a of the optical member 21.

The electro-optical member 22 is disposed on the back surface side (−Z side) of the optical member 21. The electro-optical member 22 is disposed on the back surface side (−Z side) of the light shielding frame 26. The electro-optical member 22 has an optical characteristic thereof which can be changed with voltage application. The electro-optical member 22 has a liquid crystal region 221 and a peripheral region 222. A boundary between the liquid crystal region 221 and the peripheral region 222 in the electro-optical member 22 defines a boundary between the display region 2a2 and the frame region 2a1 on the front surface 2a. The peripheral region 222 may be bonded to the back surface of the light shielding frame 26 with a transparent adhesive such as OCA.

The electro-optical member 22 has a front surface 22b on the +Z side and a back surface 22a on the −Z side. The front surface 22b has a region 22b1 and a region 22b2. The region 22b2 is located outside the region 22b1 in the XY direction. The region 22b2 corresponds to the frame region 2a1, and overlaps the frame region 2a1 when viewed from the Z direction. The region 22b1 corresponds to the display region 2a2 and overlaps the display region 2a2 when viewed from the Z direction. The back surface 22a has a region 22a1 and a region 22a2. The region 22a2 is located outside the region 22a1 in the XY direction. The region 22a2 corresponds to the frame region 2a1, and overlaps the frame region 2a1 when viewed from the Z direction. The region 22a1 corresponds to the display region 2a2 and overlaps the display region 2a2 when viewed from the Z direction.

The light shielding frame 26 covers the region 22b2. The region 22b2 corresponds to the peripheral region 222 of the electro-optical member 22. As a result, elements, wirings, terminals, and the like disposed in the peripheral region 222 of the electro-optical member 22 can be shielded, and an appearance of the display device 2 can be improved.

The liquid crystal region 221 corresponds to the display region 2a2 and extends in the XY direction. The liquid crystal region 221 includes, for example, a TN type liquid crystal panel 221a and a polarizing plate 221b disposed on the +Z side thereof. The liquid crystal panel 221a has a configuration in which a TN type liquid crystal material is sealed between a pair of transparent substrates disposed apart from each other in the Z direction and extending in the XY direction. The peripheral region 222 corresponds to the frame region 2a1 and extends so as to surround the periphery of the liquid crystal region 221 in the XY planar view. In the peripheral region 222, end portions of a pair of transparent substrates are disposed, and a member for sealing the liquid crystal material is disposed. Of the pair of transparent substrates, a +Z side surface of an end portion of the transparent substrate on the +Z side may be bonded to the back surface of the light shielding frame 26 with a transparent adhesive such as OCA. A −Z side surface of the end portion of the transparent substrate on the −Z side may be bonded to the housing 23 with a transparent adhesive such as OCA. A transparent electrode formed of a transparent conductive material such as ITO can be disposed on each of the pair of transparent substrates.

Also, a control circuit or the like connected to the pair of transparent electrodes may be disposed in the peripheral region 222. The control circuit can change an alignment state of the liquid crystal molecules by changing a voltage applied to the pair of transparent electrodes, thereby changing the optical characteristic (for example, transmittance or reflectance) of the electro-optical member 22. The VRM function is mainly realized by a change in the optical characteristic of the electro-optical member 22 and an operation of light reflection or transmission by the half mirror film 25 according to the change.

The housing 23 is disposed on the back surface side (−Z side) of the optical member 21 and is disposed outside the electro-optical member 22 in the XY direction. The housing 23 has a protruding portion 231 and a side wall portion 232. The side wall portion 232 covers an XY direction end surface 22c of the electro-optical member 22 externally in the XY direction, outside the electro-optical member 22 in the XY direction. The side wall portion 232 extends in the YZ direction or the ZX direction (see FIG. 2) and forms an outer surface 23a of the housing 23. The protruding portion 231 protrudes from the side wall portion 232 in a direction along the back surface 22a of the electro-optical member 22. The protruding portion 231 extends along the back surface 22a of the electro-optical member 22. The housing 23 can be formed of a material having a light shielding property.

The adhesive layer 24 is disposed between the back surface 22a of the electro-optical member 22 and the protruding portion 231. The adhesive layer 24 may be a member such as a double-sided tape in which an adhesive is applied to a +Z side surface and a −Z side surface. The back surface 22a of the electro-optical member 22 has the region 22a1 and the region 22a2. The region 22a2 is disposed outside the region 22a1 in the X direction. The adhesive layer 24 is disposed between the region 22a2 and the protruding portion 231, and bonds the peripheral region 222 of the electro-optical member 22 to the protruding portion 231.

That is, the light shielding frame 26 is printed or bonded to the back surface 21a of the optical member 21, and bonded to the peripheral region 222 of the electro-optical member 22 via a transparent adhesive such as OCA. The adhesive layer 24 bonds the back surface 22a of the electro-optical member 22 to the housing 23. As a result, the optical member 21 is fixed to the housing 23 via the light shielding frame 26 and the electro-optical member 22. As a result, a width of the adhesive layer 24 in the X direction can be secured according to a width of the peripheral region 222 in the X direction, and a bonding area of the adhesive layer 24 can be secured wide, so that an adhesive strength (for example, vibration resistance robustness) can be easily secured.

Figure 4A:
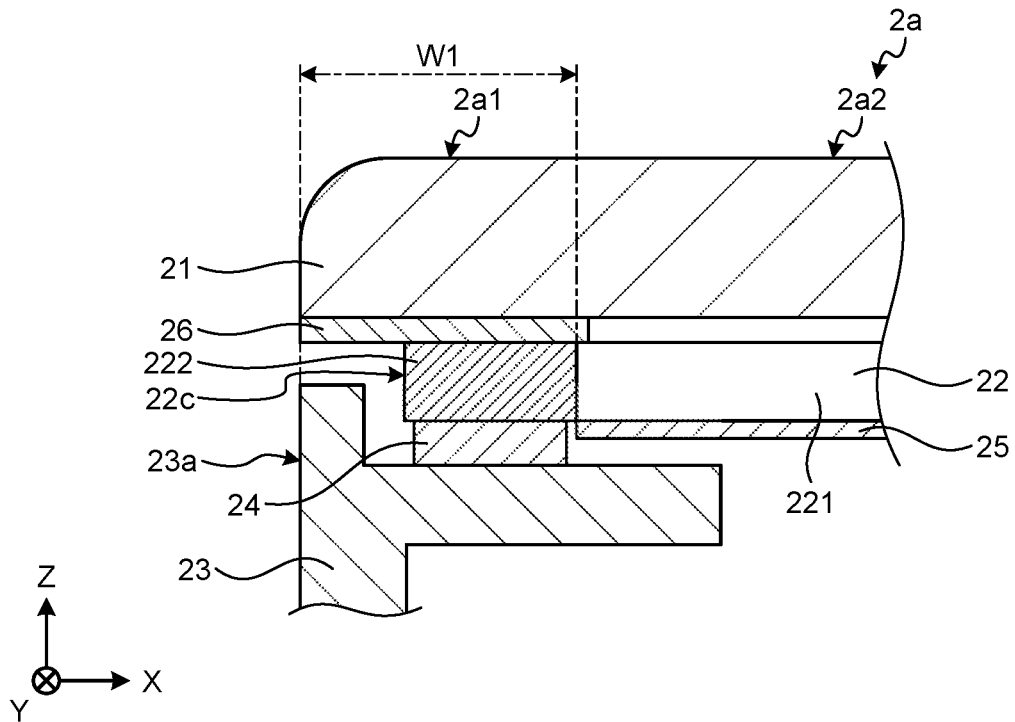
FIGS. 4A and 4B are cross-sectional diagrams illustrating frame narrowing in the embodiment.
Figure 4B:
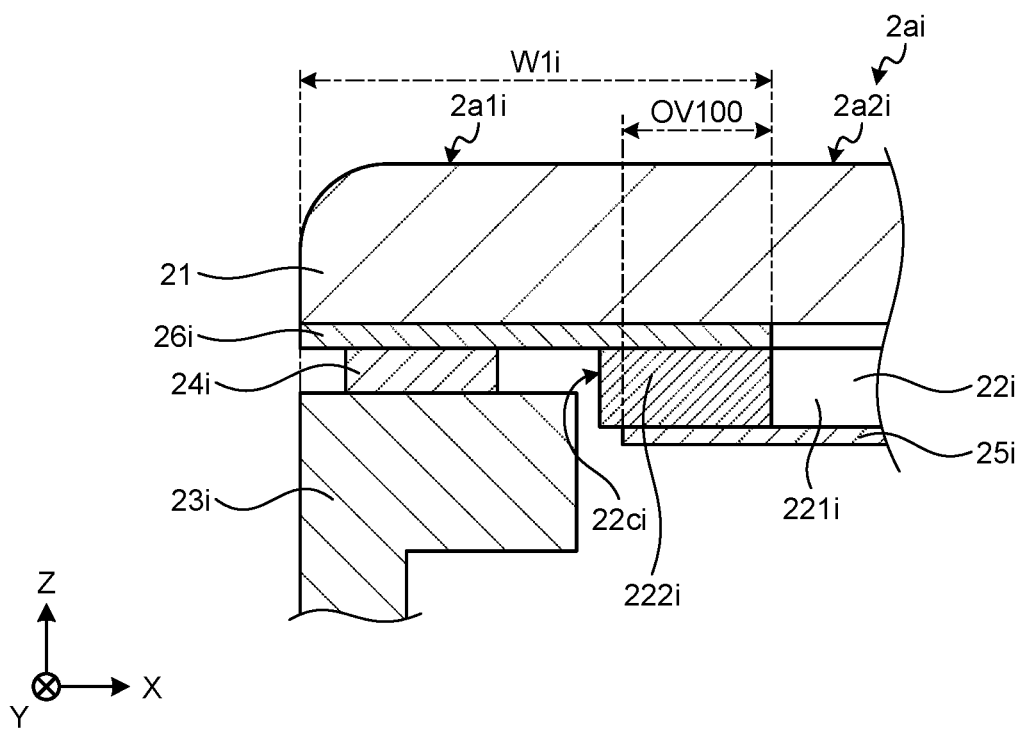

For example, as illustrated in FIG. 4B, in a case where an adhesive layer 24i bonds a light shielding frame 26i to a housing 23i, a thickness of the housing 23i in the X direction is increased in order to secure the width of the adhesive layer 24i in the X direction and secure the bonding area. The adhesive layer 24i bonds the light shielding frame 26i to a +Z side end surface of the housing 23i. Accordingly, an X-direction end portion 22ci of an electro-optical member 22i is retracted inward in the X direction, and the boundary between a liquid crystal region 221i and a peripheral region 222i in the electro-optical member 22i is retracted inward in the X direction. As a result, the boundary between a display region 2a2i and a frame region 2a1i on a front surface 2ai is retracted inward in the X direction, and a width W1i of the frame region 2a1i is increased.

On the other hand, in the structure illustrated in FIG. 3, as illustrated in FIG. 4A, the adhesive layer 24 is disposed between the back surface 22a of the electro-optical member 22 and the protruding portion 231, and the optical member 21 is fixed to the housing 23 via the light shielding frame 26 and the electro-optical member 22. Accordingly, the width of the adhesive layer 24 in the X direction can be secured according to the width of the peripheral region 222 in the X direction while locating the end portion 22c of the electro-optical member 22 in the X direction further outside in the X direction. That is, the end portion 22c of the electro-optical member 22 in the X-direction can be brought close to the outer surface 23a of the housing 23. Accordingly, the boundary between the liquid crystal region 221 and the peripheral region 222 in the electro-optical member 22 can be located further outside in the X direction. As a result, the boundary between the display region 2a2 and the frame region 2a1 on the front surface 2a can be located further outside in the X direction, and the width W1 of the frame region 2a1i can be narrowed (frame narrowing).

The half mirror film 25 illustrated in FIG. 3 is disposed between the electro-optical member 22 and the electro-optical member 27 in the Z direction. The light shielding frame 26 is disposed between the region 22a1 and the electro-optical member 27 in the Z direction. The half mirror film 25 has a substantially rectangular shape whose longitudinal direction is the X direction corresponding to the display region 2a2 (see FIG. 2). The half mirror film 25 is in contact with the back surface 22a of the electro-optical member 22 on the +Z side and covers the region 22a1. The half mirror film 25 may be bonded to the back surface 22a of the electro-optical member 22 with a transparent adhesive such as OCA. The half mirror film 25 is separated from the electro-optical member 27 on the −Z side.

Figure 5:
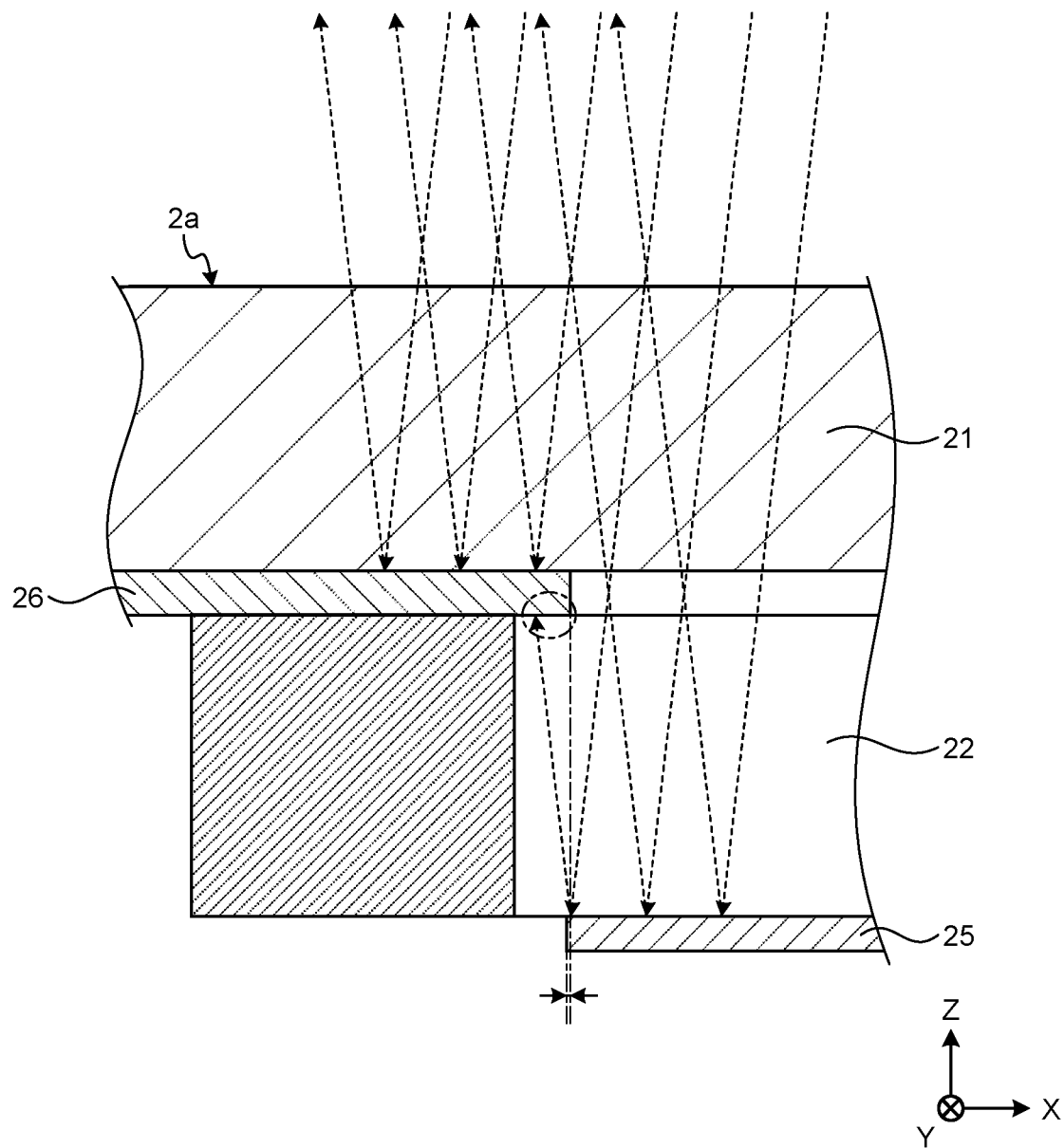
FIG. 5 is a cross-sectional diagram illustrating a reason for generation of a black line in the embodiment.

For example, the display device 2 is configured such that the color of the frame region 2a1 and the color of the display region 2a2 when observed from the +Z side in the mirror mode correspond to each other. The color of the frame region 2a1 is formed by the color of the light shielding frame 26, and the color of the display region 2a2 is mainly formed by the color of the half mirror film 25. In this case, as indicated by a dotted line in FIG. 2, a black line may be visually recognized in the vicinity of the boundary between the frame region 2a1 and the display region 2a2. It is considered that the black line is generated by light reflected on the front surface of the half mirror film 25 and directed toward the back surface of the light shielding frame 26 being shielded by the light shielding frame 26 among the light incident from the +Z side of the front surface 2a and viewed as a shadow of the light shielding frame 26 as indicated by a one-dot chain line in FIG. 5. The width of the visible black line can be, for example, approximately twice the width of the light-shielded region. When the light-shielded region becomes large, the black line is easily conspicuous.

On the other hand, in the structure illustrated in FIG. 3, the light shielding frame 26 and the half mirror film 25 are configured to be adjacent to each other or have a stripe-shaped overlapping portion when viewed from the Z direction. In this case, as illustrated in FIGS. 6A to 11, the light shielding frame 26 and the half mirror film 25 are configured such that the width of the overlapping portion when viewed from the Z direction is 0.5 mm or less. As a result, the black line width can be suppressed, and the black line can be made inconspicuous.

Figure 6A:
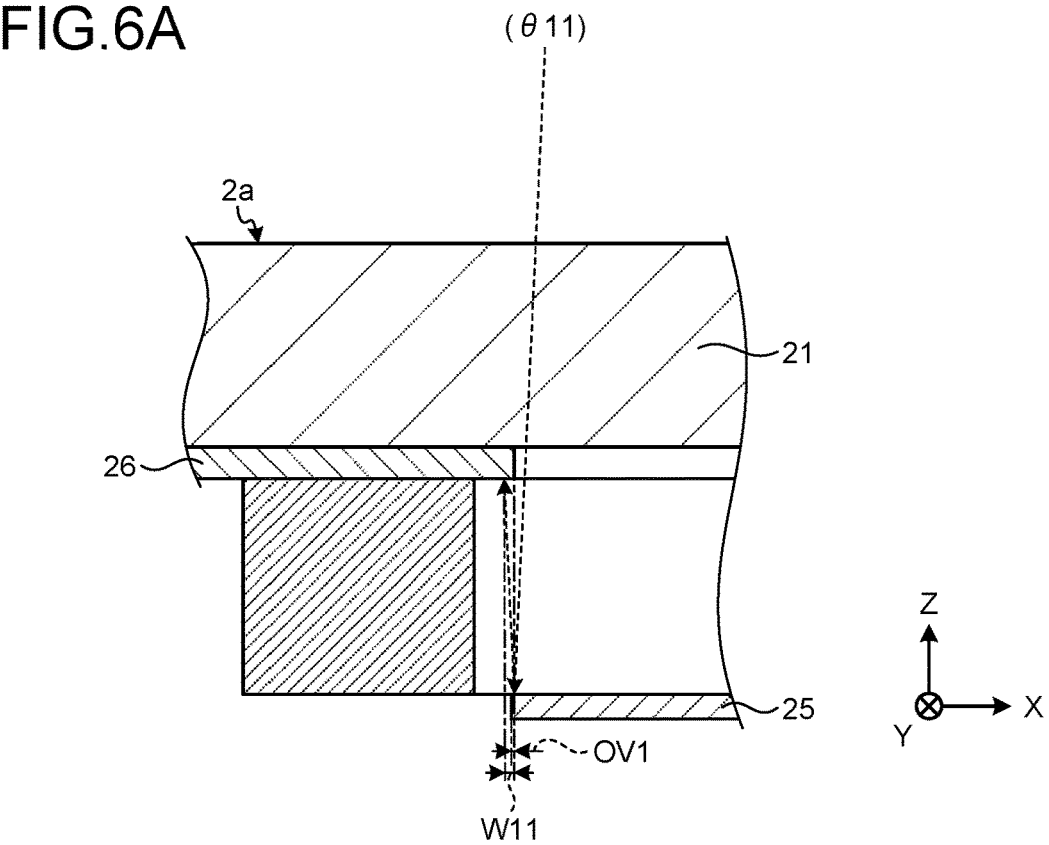
FIGS. 6A and 6B are cross-sectional diagrams illustrating a change in a black line width (in a case where a width of an overlapping portion is OV1) according to an angle in oblique view in the embodiment.
Figure 6B:
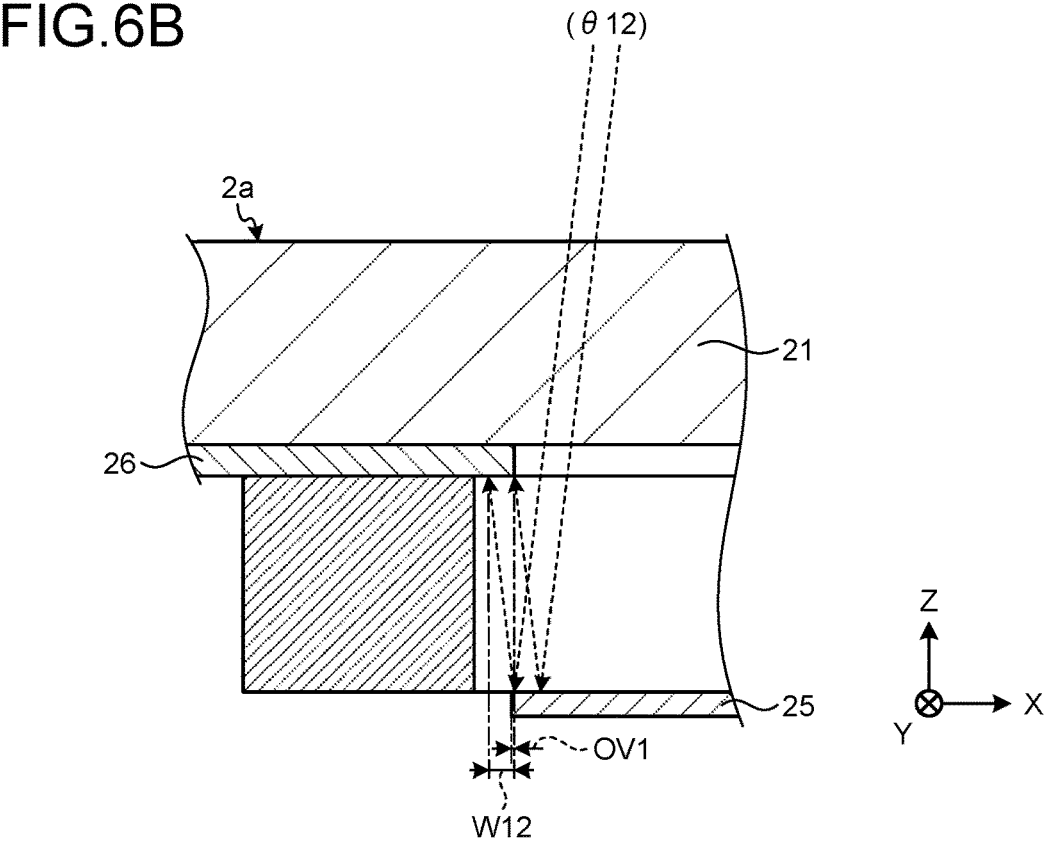

In a case where the light shielding frame 26 and the half mirror film 25 are adjacent to each other when viewed from the Z direction, that is, in a case of "Width OV1 of overlapping portion≈0 mm", the black line width changes as illustrated in FIGS. 6A and 6B according to the angle in oblique view. The angle in oblique view is defined as an inclination angle of a line of sight of an observer with respect to a normal direction (Z direction) of the front surface 2a. FIGS. 6A and 6B are cross-sectional diagrams illustrating a change in a black line width (in a case of "width of overlapping portion≈0 mm") according to the angle in oblique view.

As illustrated in FIG. 6A, in a case where the angle in oblique view is θ11, the black line width is 2×W11. As illustrated in FIG. 6B, when the angle in oblique view increases to θ12 (>θ11), the black line width increases to 2×W12 (>2×W11) accordingly.

Figure 7:
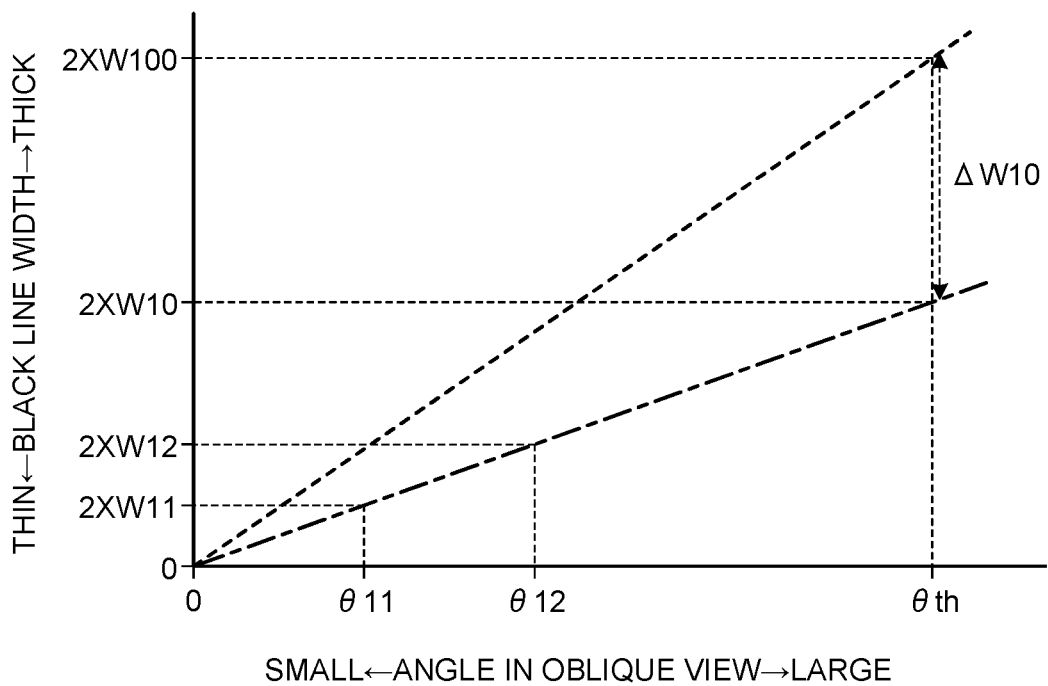
FIG. 7 is a graph illustrating a change in a black line width (in a case where a width of an overlapping portion is OV1) according to an angle in oblique view in the embodiment.

When the description is graphed, it is indicated by a one-dot chain line in FIG. 7. FIG. 7 is a graph illustrating a change in a black line width (in a case of "width of overlapping portion≈0 mm") according to the angle in oblique view. In FIG. 7, a horizontal axis represents the angle in oblique view, and a vertical axis represents the black line width. It can be seen that the black line width linearly changes according to the angle in oblique view.

On the other hand, in a case where the width of the overlapping portion between the light shielding frame 26i and a half mirror film 25i when viewed from the Z direction is relatively large OV100 (>>0.5 mm) (see FIG. 4B), the black line width linearly changes at a steeper inclination according to the angle in oblique view, as indicated by a dotted line in FIG. 7. When the maximum angle assumed when the front surface 2a is obliquely viewed is referred to as an angle threshold θth, the black line width at the angle threshold θth is 2×W100 in the case of the dotted line of FIG. 7. In the case of the one-dot chain line in FIG. 7, the black line width at the angle threshold θth is 2×W10, and an improvement amount of the black line width by setting the width OV1 of the overlapping portion≈0 mm is ΔW10=2×W100−2×W10. For example, θth=34° is satisfied, and an improvement amount ΔW10 of black line width=0.47 mm is satisfied.

Figure 8A:
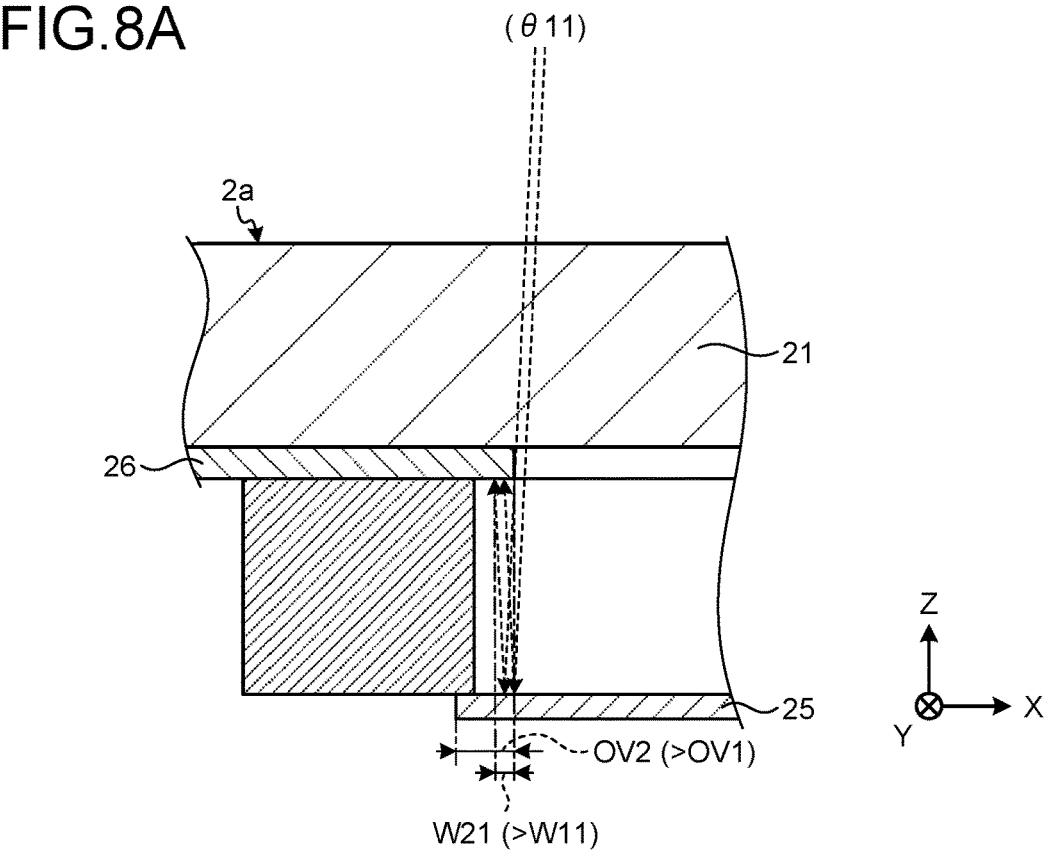
FIGS. 8A and 8B are cross-sectional diagrams illustrating a change in black line width (in a case where a width of an overlapping portion is OV2 (>OV1)) according to an angle in oblique view in the embodiment.
Figure 8B:
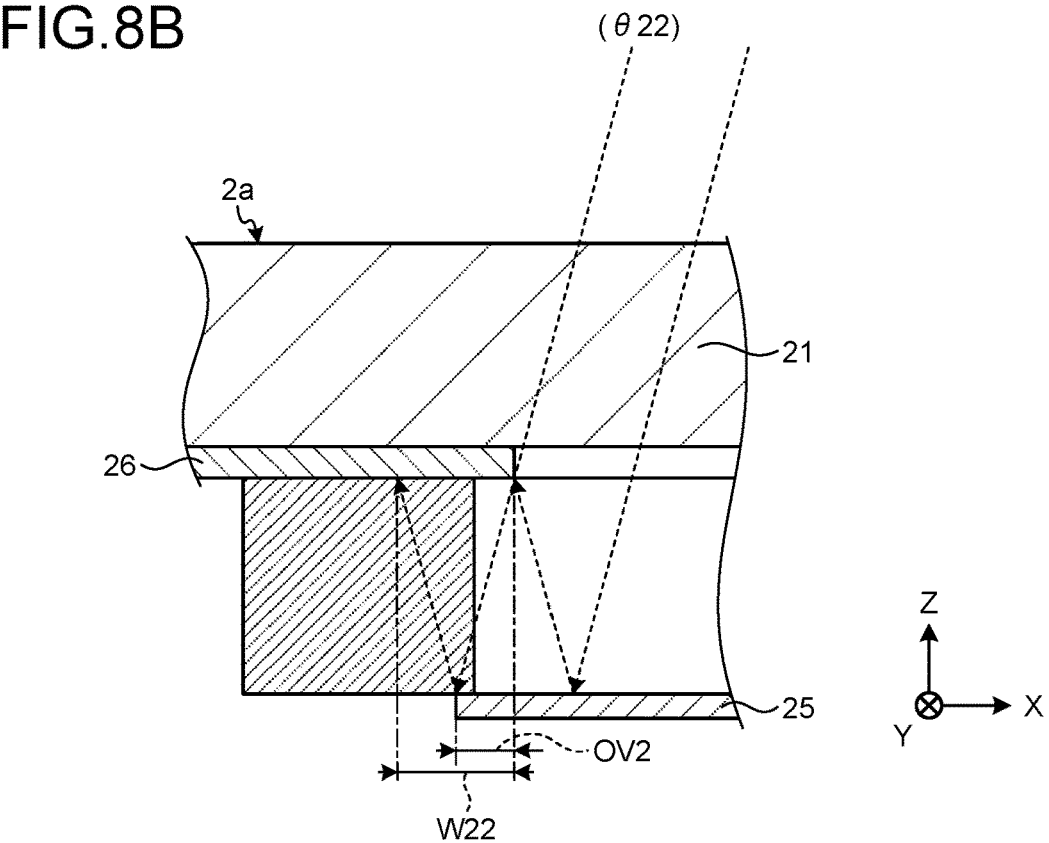

In a case where a width of the overlapping portion between the light shielding frame 26 and the half mirror film 25 when viewed from the Z direction is OV2 (>OV1), the black line width changes as illustrated in FIGS. 8A and 8B according to the angle in oblique view. FIGS. 8A and 8B are cross-sectional diagrams illustrating a change in a black line width (in a case where the width of the overlapping portion is OV2 (>OV1)) according to the angle in oblique view.

As illustrated in FIG. 8A, in a case where the angle in oblique view is θ11, the black line width is 2×W21. As compared with FIG. 6A, it can be seen that a shadow is easily generated due to an influence of the overlapping portion, and the black line width 2×W21 is accordingly increased (2×W21>2×W11). As illustrated in FIG. 8B, when the angle in oblique view increases to θ22 (>θ11), the black line width increases to 2×W22 (>2×W21) accordingly. The angle θ22 of oblique view is an angle at which light passing through the +X side end of the light shielding frame 26 is incident on the −X side end of the half mirror film 25. It is considered that when the angle in oblique view is larger than θ22, the influence of the overlapping portion disappears, and the black line width changes similarly to the case of width of overlapping portion≈0 mm.

Figure 9:
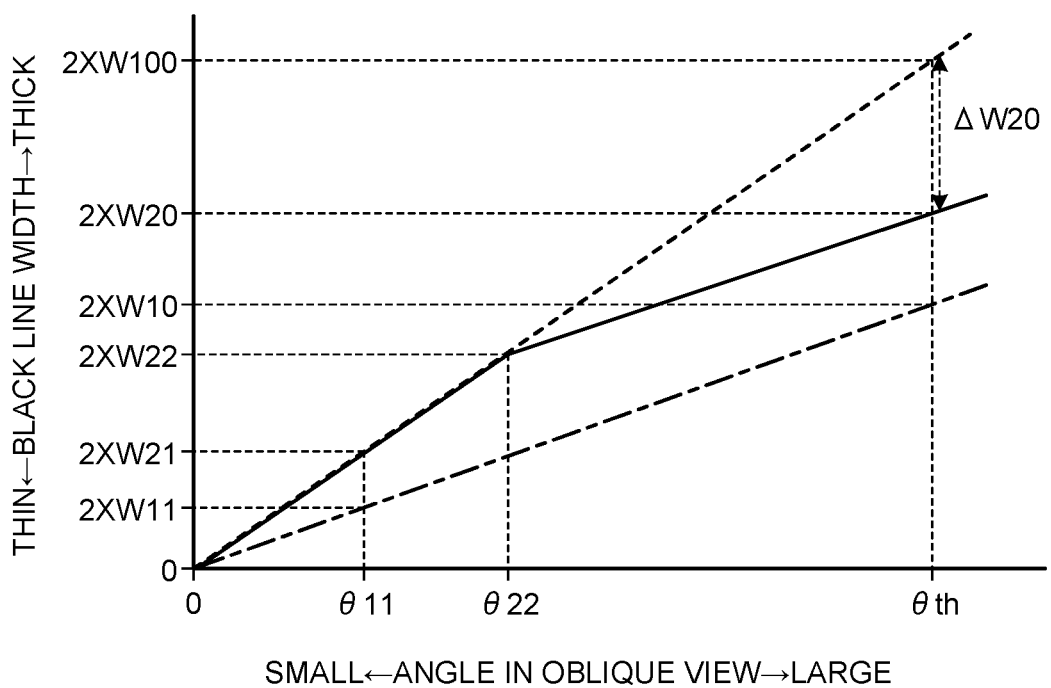
FIG. 9 is a graph illustrating a change in a black line width (in a case where a width of an overlapping portion is OV2 (>OV1)) according to an angle in oblique view in the embodiment.

When the description is graphed, it is indicated by a solid line in FIG. 9. FIG. 9 is a graph illustrating a change in a black line width (in a case where the width of the overlapping portion is OV2 (>OV1)) according to the angle in oblique view. In FIG. 9, a horizontal axis represents the angle in oblique view, and a vertical axis represents the black line width. The black line width changes at the same inclination as the dotted line until the angle in oblique view reaches θ22, and changes at the same inclination as the one-dot chain line when the angle in oblique view becomes θ22 or larger. The dotted line in FIG. 9 corresponds to the dotted line in FIG. 7, and indicates the change of the black line width according to the angle in oblique view in the case where the width of the overlapping portion is relatively large OV100. The one-dot chain line in FIG. 9 corresponds to the one-dot chain line in FIG. 7, and indicates a change in the black line width according to the angle in oblique view when the width of the overlapping portion is substantially zero.

In the case of the dotted line in FIG. 9, the black line width at the angle threshold θth is 2×W100. In the case of the solid line in FIG. 9, the black line width at the angle threshold θth is 2×W20, and an improvement amount of the black line width by setting the width OV2 of the overlapping portion is ΔW20=2×W100−2×W20. For example, in a case of OV2=0.2 mm, θ22=13.95° and θth=34° are satisfied, and improvement amount of black line width ΔW20=0.28 mm is satisfied.

Figure 10A:
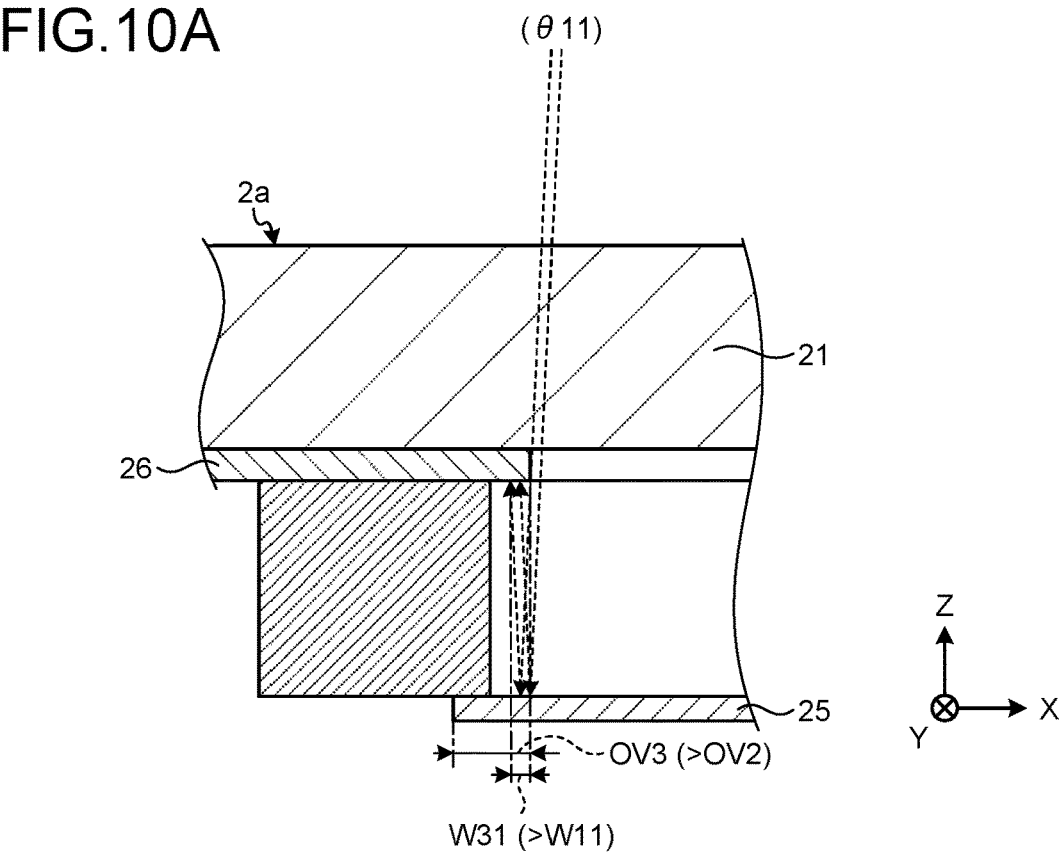
FIGS. 10A and 10B are cross-sectional diagrams illustrating a change in black line width (in a case where a width of an overlapping portion is OV3 (>OV2)) according to an angle in oblique view in the embodiment.
Figure 10B:
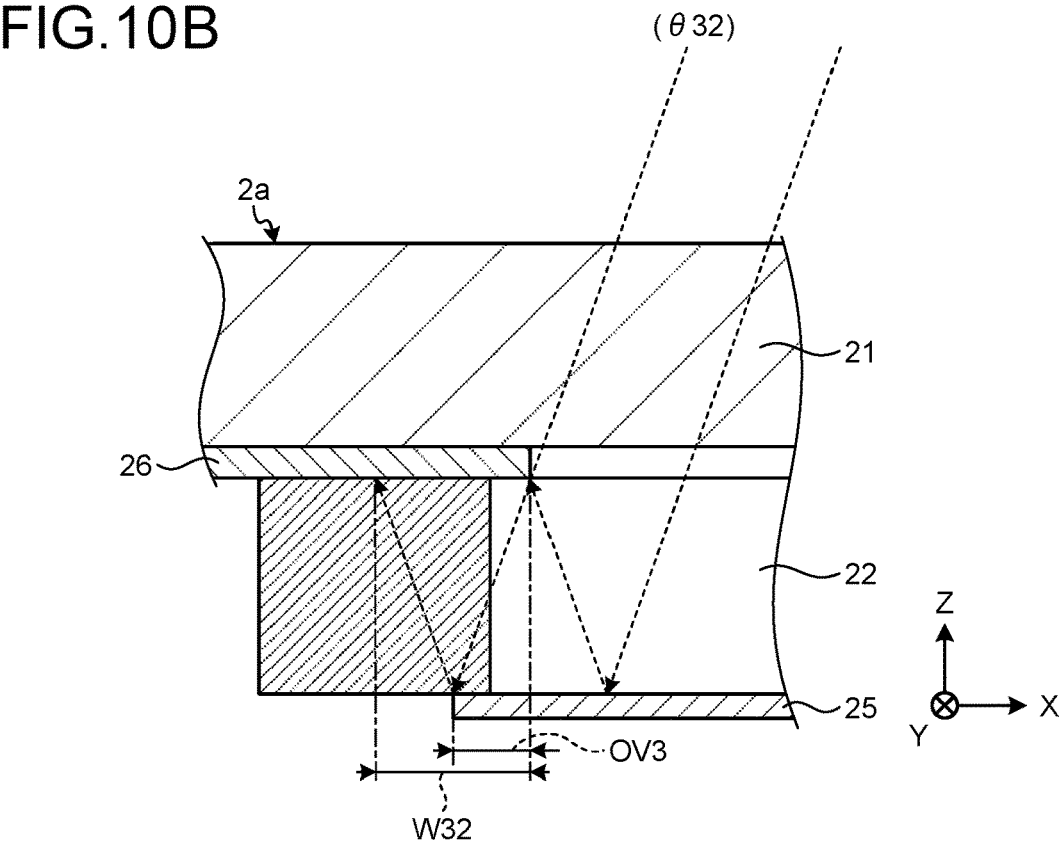

In a case where the width of the overlapping portion between the light shielding frame 26 and the half mirror film 25 when viewed from the Z direction is OV3 (>OV2), the black line width changes as illustrated in FIGS. 10A and 10B according to the angle in oblique view. FIGS. 10A and 10B are cross-sectional diagrams illustrating a change in a black line width (in a case where the width of the overlapping portion is OV3 (>OV2)) according to the angle in oblique view.

As illustrated in FIG. 10A, in a case where the angle in oblique view is θ11, the black line width is 2×W31. As compared with FIG. 6A, it can be seen that a shadow is easily generated due to an influence of the overlapping portion, and the black line width W31 is accordingly increased (2×W31>2×W11). As illustrated in FIG. 10B, when the angle in oblique view increases to θ32 (>θ11), the black line width increases to 2×W32 (>2×W31) accordingly. The angle θ32 of oblique view is an angle at which light passing through the +X side end of the light shielding frame 26 is incident on the −X side end of the half mirror film 25. It is considered that when the angle in oblique view is larger than θ32, the influence of the overlapping portion disappears, and the black line width changes similarly to the case of width of overlapping portion≈0 mm.

Figure 11:
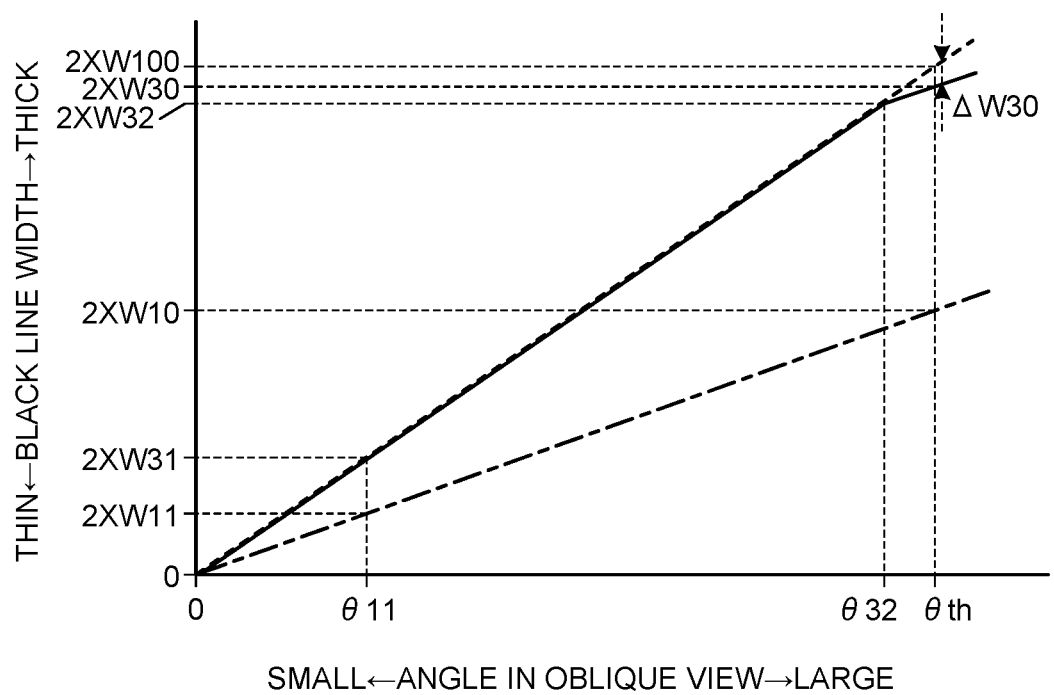
FIG. 11 is a graph illustrating a change in a black line width (in a case where a width of an overlapping portion is OV3 (>OV2)) according to an angle in oblique view in the embodiment.

When the description is graphed, it is indicated by a solid line in FIG. 11. FIG. 11 is a graph illustrating a change in a black line width (in a case where the width of the overlapping portion is OV3 (>OV2)) according to the angle in oblique view. In FIG. 11, a horizontal axis represents the angle in oblique view, and a vertical axis represents the black line width. The black line width changes at the same inclination as the dotted line until the angle in oblique view reaches θ32, and changes at the same inclination as the one-dot chain line when the angle in oblique view becomes θ32 or larger. The dotted line in FIG. 11 corresponds to the dotted line in FIG. 7, and indicates the change of the black line width according to the angle in oblique view in the case where the width of the overlapping portion is relatively large OV100. The one-dot chain line in FIG. 11 corresponds to the one-dot chain line in FIG. 7, and indicates a change in the black line width according to the angle in oblique view when the width of the overlapping portion is substantially zero.

In the case of the dotted line in FIG. 11, the black line width at the angle threshold θth is 2×W100. In the case of the solid line in FIG. 11, the black line width at the angle threshold θth is 2×W30, and an improvement amount of the black line width by setting the width OV3 of the overlapping portion is ΔW30=2×W100−2×W30. For example, in a case of OV3=0.5 mm, θ32=31.85° and θth=34° are satisfied, and improvement amount of black line width ΔW30=0.04 mm is satisfied. The improvement amount of the black line width is a positive value, but is close to zero.

For example, it is considered that in a case of setting the width of the overlapping portion>0.5 mm, an angle at which the inclination of the dotted line changes to the inclination of the one-dot chain line is equal to or larger than the angle threshold θth, in the change of the black line width according to the angle in oblique view. That is, it can be said that in a case of setting the width of the overlapping portion>0.5 mm, there is substantially no improvement amount of the black line width in an angle range of θth or smaller in oblique view.

On the other hand, for example, by setting 0 mm width of overlapping portion≤0.5 mm, as illustrated in FIGS. 7, 9, and 11, the black line width can be suppressed and the black line can be made inconspicuous.

Returning to FIG. 3, the frame member 29 is disposed between the housing 23 and the electro-optical member 27 in the XY direction. The frame member 29 extends along the YZ direction or the ZX direction. The frame member 29 is bent inward in the XY direction such that an end portion on the +Z side covers the electro-optical member 27 from the +Z side. The frame member 29 may be made of a sheet-metal processable material such as metal. The frame member 29 may be fixed to the housing 23.

The electro-optical member 27 is disposed on the back surface 22a side (−Z side) of the electro-optical member 22. The electro-optical member 27 is disposed between the electro-optical member 22 and the optical member 31 in the Z direction. The electro-optical member 27 is disposed between the frame member 29 and the frame member 30 in the Z direction. The electro-optical member 27 has an optical characteristic thereof which can be changed with voltage application. The electro-optical member 27 has a liquid crystal region 271 and a peripheral region 272. The electro-optical member 27 may be, for example, a display panel for image display.

The liquid crystal region 271 corresponds to the display region 2a2 and extends in the XY direction. The liquid crystal region 271 includes, for example, a TFT type liquid crystal panel 271a and a polarizing plate 271b disposed on the +Z side thereof. The liquid crystal panel 271a has a configuration in which a TFT type liquid crystal material is sealed between a pair of transparent substrates disposed apart from each other in the Z direction and extending in the XY direction. The peripheral region 272 corresponds to the frame region 2a1 and extends so as to surround the periphery of the liquid crystal region 271 in the XY planar view. In the peripheral region 272, end portions of a pair of transparent substrates are disposed, and a member for sealing the liquid crystal material is disposed. Of the pair of transparent substrates, a −Z side surface of an end portion of the transparent substrate on the −Z side may be bonded to the frame member 30 with a transparent adhesive such as OCA. A transparent electrode formed of a transparent conductive material such as ITO can be disposed on each of the pair of transparent substrates.

Also, a control circuit or the like connected to the pair of transparent electrodes may be disposed in the peripheral region 272. The control circuit can change an alignment state of the liquid crystal molecules by changing a voltage applied to the pair of transparent electrodes, thereby changing the optical characteristic (for example, transmittance) of the electro-optical member 27. The image display function is mainly realized by a change in an optical characteristic of the electro-optical member 27.

The frame member 30 is disposed between the frame member 29 and the case 32 and the optical member 31 in the XY direction. The frame member 30 extends along the YZ direction or the ZX direction. The frame member 30 has a bent portion 30a bent inward in the XY direction such that an end portion on the +Z side covers the case 32 and the optical member 31 from the +Z side. The frame member 30 may be made of a sheet-metal processable material such as metal. The frame member 30 may be fixed to the housing 23 directly or via the frame member 29.

The adhesive layer 28 is disposed between the back surface of the electro-optical member 27 and the bent portion 30a of the frame member 30. The adhesive layer 28 may be a member such as a double-sided tape in which an adhesive is applied to a +Z side surface and a −Z side surface. The adhesive layer 28 is disposed between an outer region on the back surface of the electro-optical member 27 and the bent portion 30a of the frame member 30, and bonds the peripheral region 272 of the electro-optical member 27 to the bent portion 30a of the frame member 30.

That is, the adhesive layer 28 bonds the back surface of the electro-optical member 27 to the frame member 30. As a result, the electro-optical member 27 is fixed to the housing 23 via the frame member 30. Accordingly, the width of the adhesive layer 28 in the X direction can be secured according to the width of the peripheral region 272 in the X direction while locating the end portion of the electro-optical member 27 in the X direction relatively outside in the X direction. As a result, a wide bonding region of the adhesive layer 28 can be secured while securing a wide display region, so that it is possible to easily secure the bonding strength.

The optical member 31 is disposed on the back surface side (−Z side) of the electro-optical member 27. The optical member 31 extends in a plate shape in an XY direction and has a substantially rectangular shape whose longitudinal direction is the X direction. The optical member 31 is configured to illuminate the electro-optical member 27 from the back surface side. The optical member 31 is, for example, a backlight.

The case 32 is disposed on the back surface side (−Z side) of the electro-optical member 27 and is disposed on the −Z side of the optical member 31. The case 32 has a box shape open on the +X side, and can accommodate the optical member 31. The case 32 may be fixed to the housing 23 directly or via the frame member 30 and/or the frame member 29.

As described above, in the embodiment, in the display device 2, the adhesive layer 24 is disposed between the back surface 22a of the electro-optical member 22 and the protruding portion 231, and the optical member 21 is fixed to the housing 23 via the light shielding frame 26, the electro-optical member 22, and the adhesive layer 24. That is, the end portion 22c of the electro-optical member 22 in the X-direction can be brought close to the outer surface 23a of the housing 23 while securing the bonding area of the adhesive layer 24. Accordingly, the width W1 of the frame region 2a1i on the front surface 2a can be narrowed (frame narrowing). Therefore, an attraction (design) of the appearance of the display device 2 can be improved. In addition, the display device 2 can be easily reduced in size and/or weight, the display device 2 can be reduced in cost, and adhesion by the adhesive layer 24 can be stabilized.

Also, in the embodiment, in the display device 2, the light shielding frame 26 and the half mirror film 25 are configured to be adjacent to each other or have a stripe-shaped overlapping portion when viewed from the Z direction. For example, by setting 0 mm (width of overlapping portion when viewed from Z direction) 0.5 mm, the black line width when the front surface 2a is observed can be suppressed, and the black line can be made inconspicuous.

Figure 12:
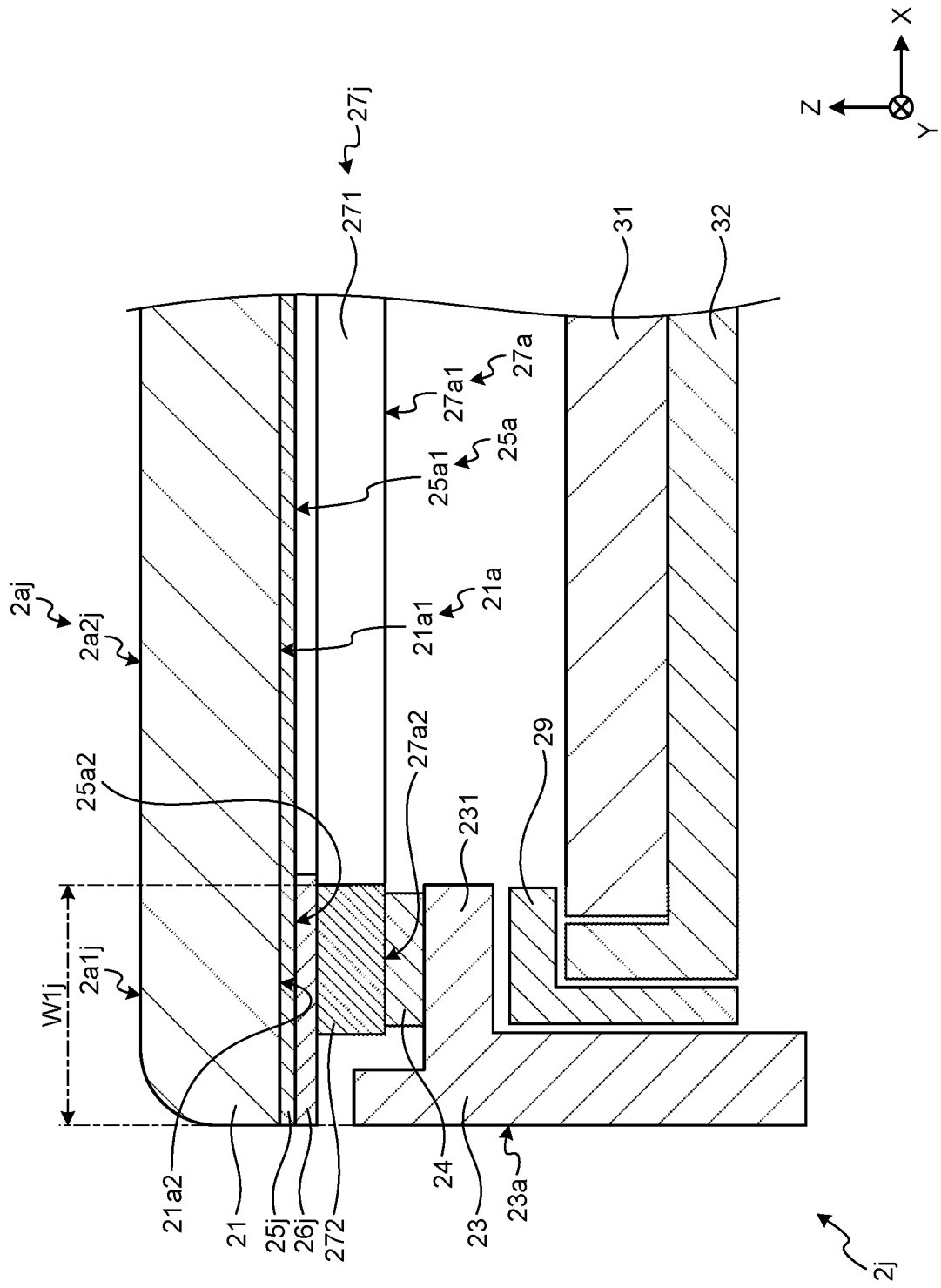
FIG. 12 is a cross-sectional diagram illustrating a configuration of a display device according to a modification example of the embodiment.

Note that an aspect of the present embodiment is also applicable to a display device (for example, a half mirror type electronic mirror) having no VRM function. For example, as a modification of the embodiment, a display device 2j can be configured as illustrated in FIG. 12. FIG. 12 is a cross-sectional diagram illustrating a configuration of the display device 2j according to a modification example of the embodiment.

The display device 2j includes a half mirror film 25j, a light shielding frame 26j, and an electro-optical member 27j instead of the half mirror film 25, the light shielding frame 26, and the electro-optical member 27 (see FIG. 3), and the electro-optical member 22, the frame member 29, and the adhesive layer 28 are omitted.

The half mirror film 25j is moved between the optical member 21 and the light shielding frame 26 with respect to the half mirror film 25 (see FIG. 3), and an area thereof is enlarged so as to cover the region 21a1 and the region 21a2 of the back surface 21a of the optical member 21. The electro-optical member 27j is moved between the light shielding frame 26j and the adhesive layer 24 with respect to the electro-optical member 27 (see FIG. 3).

A back surface 25a of the half mirror film 25j has a region 25a1 and a region 25a2. The region 25a2 is located outside the region 25a1 in the XY direction. The region 25a2 corresponds to a frame region 2a1j, and overlaps the frame region 2a1j when viewed from the Z direction. The region 25a1 corresponds to a display region 2a2j and overlaps the display region 2a2j when viewed from the Z direction.

The light shielding frame 26j is in contact with the back surface 25a of the half mirror film 25j on the +Z side and covers the region 25a2. The light shielding frame 26j is in contact with the electro-optical member 27j on the −Z side, and covers a +Z side surface of the electro-optical member 27j.

In the electro-optical member 27j, the peripheral region 272 on the +Z side is bonded to the light shielding frame 26j with an adhesive such as OCA, for example, and the peripheral region 272 on the −Z side is bonded to the protruding portion 231 of the housing 23 via the adhesive layer 24. A function of the electro-optical member 27j is similar to the function of the electro-optical member 27. A back surface 27a of the electro-optical member 27 has a region 27a1 and a region 27a2. The region 27a2 is disposed outside the region 27a1 in the X direction.

The adhesive layer 24 is disposed between the region 27a2 and the protruding portion 231, and bonds the peripheral region 272 of the electro-optical member 27 to the protruding portion 231.

Also, in this display device 2j, the adhesive layer 24 is disposed between the back surface 27a of the electro-optical member 27 and the protruding portion 231, and the optical member 21 is fixed to the housing 23 via the light shielding frame 26j, the electro-optical member 27, and the adhesive layer 24. That is, the end portion 22c of the electro-optical member 27 in the X-direction can be brought close to the outer surface 23a of the housing 23 while securing the bonding area of the adhesive layer 24. Accordingly, the width W1j of the frame region 2a1j on a front surface 2aj can be narrowed (frame narrowing).

According to the display device of the present disclosure, a frame can be narrowed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display device comprising:
an optical member that has translucency and has a back surface including a first region and a second region outside the first region;
a first electro-optical member that is disposed on the back surface side of the optical member, has an optical characteristic changed with voltage application, and has a back surface including a third region and a fourth region outside the third region;
a housing that is disposed on the back surface side of the optical member and outside the first electro-optical member, and has a protruding portion extending along the back surface of the first electro-optical member;
an adhesive layer that is disposed between the fourth region and the protruding portion in a direction perpendicular to a front surface of the optical member;
a half mirror film that covers the third region; and
a light shielding frame that covers the second region, wherein
when viewed from the direction perpendicular to the front surface of the optical member, the light shielding frame and the half mirror film have an overlapping portion that is stripe-shaped and a width of the overlapping portion is 0.5 mm or less, and
the first electro-optical member is provided between the light shielding frame and the half mirror film in the direction perpendicular to the front surface of the optical member.

2. The display device according to claim 1, further comprising
a second electro-optical member that is disposed on the back surface side of the first electro-optical member and has an optical characteristic that is changeable with voltage application.

3. The display device according to claim 1, wherein
the half mirror film covers the first region and the second region,
the half mirror film has a back surface including a fifth region and a sixth region outside the fifth region, and
the light shielding frame covers the sixth region.

4. The display device according to claim 1, wherein
the housing has a side wall portion that covers an end surface of the first electro-optical member externally, outside the first electro-optical member, and
the protruding portion protrudes from the side wall portion in a direction along the back surface of the first electro-optical member.

5. The display device according to claim 1, wherein
the light shielding frame is a mirror-finished printing formed by applying a resin containing a silver pigment.

6. The display device according to claim 1, wherein
the light shielding frame is a frame-shaped sheet of a resin containing a silver pigment.

7. A display device comprising:
an optical member that has translucency and has a back surface including a first region and a second region outside the first region;
a first electro-optical member that is disposed on the back surface side of the optical member, has an optical characteristic changed with voltage application, and has a back surface including a third region and a fourth region outside the third region;
a housing that is disposed on the back surface side of the optical member and outside the first electro-optical member;
a half mirror film that covers the third region; and
a light shielding frame that covers the second region, wherein
when viewed from a direction perpendicular to a front surface of the optical member, the light shielding frame and the half mirror film have an overlapping portion that is stripe-shaped and a width of the overlapping portion is 0.5 mm or less, and
the first electro-optical member is provided between the light shielding frame and the half mirror film in the direction perpendicular to the front surface of the optical member.

8. The display device according to claim 7, wherein
the light shielding frame is a mirror-finished printing formed by applying a resin containing a silver pigment.

9. The display device according to claim 7, wherein
the light shielding frame is a frame-shaped sheet of a resin containing a silver pigment.

10. A display device comprising:
an optical member that has translucency and has a back surface including a first region and a second region outside the first region;
a first electro-optical member that is disposed on the back surface side of the optical member, has an optical characteristic changed with voltage application, and has a back surface including a third region and a fourth region outside the third region;
a housing that is disposed on the back surface side of the optical member and outside the first electro-optical member;
a half mirror film that covers the third region; and
a light shielding frame that covers the second region, wherein
when viewed from a direction perpendicular to a front surface of the optical member, the light shielding frame and the half mirror film have an overlapping portion that is stripe-shaped where the overlapping portion has a width that is 0.5 mm or less.

11. The display device according to claim 10, wherein
the light shielding frame is a mirror-finished printing formed by applying a resin containing a silver pigment.

12. The display device according to claim 10, wherein
the light shielding frame is a frame-shaped sheet of a resin containing a silver pigment.

* * * * *